(12) United States Patent
Qiu et al.

(10) Patent No.: US 12,118,776 B2
(45) Date of Patent: Oct. 15, 2024

(54) IMAGE PROCESSING METHOD, APPARATUS, AND DEVICE, AND STORAGE MEDIUM

(71) Applicant: Beijing Zitiao Network Technology Co., Ltd., Beijing (CN)

(72) Inventors: Shunming Qiu, Beijing (CN); Xiaobin Guo, Beijing (CN); Gang Li, Beijing (CN); Gen Li, Beijing (CN); Shupeng Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/511,639

(22) Filed: Nov. 16, 2023

(65) Prior Publication Data

US 2024/0087309 A1     Mar. 14, 2024

Related U.S. Application Data

(63) Continuation of application No. PCT/CN2022/098362, filed on Jun. 13, 2022.

(30) Foreign Application Priority Data

Jul. 12, 2021    (CN) ......................... 202110783343.X

(51) Int. Cl.
     *G06K 9/46*         (2006.01)
     *G06K 9/66*         (2006.01)
     (Continued)

(52) U.S. Cl.
     CPC ............ *G06V 10/993* (2022.01); *G06V 10/10* (2022.01); *G06V 10/40* (2022.01); *G06V 10/74* (2022.01)

(58) Field of Classification Search
None
See application file for complete search history.

(56) References Cited

U.S. PATENT DOCUMENTS 7,751,805 B2 *   7/2010   Neven .................. G06V 30/242
                                               455/414.3
9,471,831 B2 *   10/2016   Kim ..................... G06V 10/993
(Continued)

FOREIGN PATENT DOCUMENTS

| CN | 102496010 A | 6/2012 |
| CN | 108399349 A | 8/2018 |

(Continued)

*Primary Examiner* — Feng Niu
(74) *Attorney, Agent, or Firm* — Alleman Hall & Tuttle LLP

(57) ABSTRACT

The present disclosure provides an image processing method, apparatus, and device, and a storage medium. The method includes determining, in response to receiving a preset identification operation triggered for a capturing frame on a capturing page, a target image having image clarity meeting a preset clarity condition based on the capturing frame on the capturing page. Then, the target image is transmitted to an image identification server for image identifying. Thus, the image processing method provided in the embodiments of the present disclosure can determine a target image having image clarity meeting a preset clarity condition first before image identification and allow an image identification server to perform identification based on the target image which meets the preset clarity condition, thereby the accuracy of image identification can be improved.

11 Claims, 4 Drawing Sheets

(51) Int. Cl.
*G06V 10/10* (2022.01)
*G06V 10/40* (2022.01)
*G06V 10/74* (2022.01)
*G06V 10/98* (2022.01)

(56) References Cited

U.S. PATENT DOCUMENTS

| | | | | |
|---|---|---|---|---|
| 10,091,383 | B2* | 10/2018 | Goh | H04N 1/19594 |
| 10,902,234 | B2* | 1/2021 | Feng | G06K 7/1417 |
| 10,939,035 | B2* | 3/2021 | Ji | G06T 7/0002 |
| 10,984,514 | B2* | 4/2021 | Higuchi | G06T 7/0002 |
| 11,210,502 | B2* | 12/2021 | Zheng | G06V 40/172 |
| 11,487,966 | B2* | 11/2022 | Niu | G06V 10/803 |
| 11,657,609 | B2* | 5/2023 | Yoshigahara | G06V 10/40 382/103 |
| 11,704,923 | B2* | 7/2023 | Bridges | G06V 10/993 348/207.1 |
| 2004/0052413 | A1* | 3/2004 | Kunii | G06F 18/2132 382/190 |
| 2006/0017820 | A1* | 1/2006 | Kim | H04N 5/772 386/E5.072 |
| 2008/0304891 | A1* | 12/2008 | Saijo | G06K 1/121 400/76 |
| 2014/0119618 | A1 | 5/2014 | Kim et al. | |
| 2015/0256649 | A1* | 9/2015 | Nishi | H04L 69/40 709/203 |
| 2016/0070952 | A1* | 3/2016 | Kim | G06T 17/00 382/118 |
| 2018/0139345 | A1* | 5/2018 | Goh | H04N 1/19594 |
| 2018/0342052 | A1* | 11/2018 | Higuchi | G06V 40/13 |
| 2019/0065808 | A1* | 2/2019 | Zhang | G06F 3/04817 |
| 2020/0005054 | A1* | 1/2020 | Cionca | G06V 20/58 |
| 2020/0077017 | A1* | 3/2020 | Ji | H04N 23/64 |
| 2020/0134355 | A1* | 4/2020 | Shinoda | G06V 10/774 |
| 2020/0310637 | A1 | 10/2020 | Kim et al. | |
| 2020/0356742 | A1* | 11/2020 | Feng | G06K 7/1417 |
| 2021/0166003 | A1* | 6/2021 | Chen | G06V 40/166 |
| 2021/0192190 | A1* | 6/2021 | Zheng | G06V 10/751 |
| 2021/0248735 | A1* | 8/2021 | Edvardsson | G06T 7/0004 |
| 2021/0374447 | A1* | 12/2021 | Liu | G06T 5/20 |
| 2022/0058376 | A1* | 2/2022 | Wang | G06V 40/45 |
| 2022/0058426 | A1* | 2/2022 | Song | G06F 16/53 |
| 2022/0075821 | A1* | 3/2022 | Matsushita | G06V 10/454 |
| 2022/0159177 | A1* | 5/2022 | Oshima | G06V 10/42 |
| 2023/0087657 | A1* | 3/2023 | Chen | G06V 10/993 382/118 |
| 2023/0093572 | A1* | 3/2023 | Dai | G06V 20/52 348/150 |
| 2023/0177800 | A1* | 6/2023 | Hao | G06N 3/04 382/181 |

FOREIGN PATENT DOCUMENTS

| | | | | |
|---|---|---|---|---|
| CN | 109145903 | A | | 1/2019 |
| CN | 110807491 | A | | 2/2020 |
| CN | 111080493 | A | | 4/2020 |
| CN | 111104988 | A | | 5/2020 |
| CN | 111222419 | A | * | 6/2020 ......... G06K 9/00664 |
| CN | 112767392 | A | | 5/2021 |
| CN | 112949423 | A | | 6/2021 |
| CN | 113505700 | A | | 10/2021 |
| JP | 2008005108 | A | * | 1/2008 |
| JP | 2019008456 | A | * | 1/2019 ......... H04N 1/00196 |
| WO | WO-2019101021 | A1 | * | 5/2019 ............ G06K 9/32 |
| WO | WO-2020137678 | A1 | * | 7/2020 |

* cited by examiner

12,118,776 B2

IMAGE PROCESSING METHOD, APPARATUS, AND DEVICE, AND STORAGE MEDIUM

CROSS REFERENCE TO RELATED APPLICATION

This patent application is a continuation of International Patent Application No. PCT/CN2022/098362 filed on Jun. 13, 2022, which claims the priority to and benefits of Chinese Patent Application No. 202110783343.X filed on Jul. 12, 2021 and entitled "IMAGE PROCESSING METHOD AND APPARATUS, AND DEVICE AND STORAGE MEDIUM". All the aforementioned patent applications are hereby incorporated by reference in their entireties.

TECHNICAL FIELD

The present disclosure relates to the field of data processing, and in particular, to an image processing method, apparatus, and device, and a storage medium.

BACKGROUND

With the popularity of multimedia short videos, people are increasingly interested in image or video capturing. An increasing number of functions are provided on a capturing page, such as an identification function for a capturing frame on the capturing page. How to improve the accuracy of image identification is a technical problem urgently needing to be solved at present.

SUMMARY

To solve or solve at least in part the above-mentioned technical problem, the embodiments of the present disclosure provide an image processing method that can allow an image identification server to perform identification based on a target image having image charity meeting a preset charity condition, and thus, the accuracy of image identification can be improved.

In a first aspect, the present disclosure provides an image processing method. The method includes:
 determining, in response to receiving a preset identification operation triggered for a capturing frame on a capturing page, a target image having image clarity meeting a preset clarity condition based on the capturing frame on the capturing page; and
 transmitting the target image to an image identification server, wherein the image identification server is configured to identify the target image.

In an optional implementation, before the transmitting the target image to the image identification server, the method further includes:
 extracting an image feature of the target image;
 performing matching between the image feature and prestored feature parameters of preset objects; and
 determining, in response to determining that the matching is successful, a preset object corresponding to a successfully matched feature parameter as an initial identification result for the target image.

Accordingly, the transmitting the target image to the image identification server includes:
 transmitting the target image and the initial identification result for the target image to the image identification server, wherein the image identification server is configured to identify the target image based on the initial identification result.

In an optional implementation, the transmitting the target image to the image identification server further includes:
 if determining that the matching between the image feature and the prestored feature parameters of the preset objects is failed, transmitting the target image to the image identification server.

In an optional implementation, the determining, in response to receiving the preset identification operation triggered for the capturing frame on the capturing page, the target image having image clarity meeting the preset clarity condition based on the capturing frame on the capturing page includes:
 obtaining, in response to receiving the preset identification operation triggered for the capturing frame on the capturing page, a current image corresponding to the capturing frame and determining whether the image clarity of the current image meets the preset clarity condition; and
 if determining that the image clarity of the current image meets the preset clarity condition, determining the current image as the target image, otherwise re-performing the step of obtaining a current image corresponding to the capturing frame and determining whether the image clarity of the current image meets the preset clarity condition until a preset number of times of image acquisition is reached.

In an optional implementation, when the preset number of times of image acquisition is reached and no image meets the preset clarity condition is determined, displaying identification failure prompt information on the capturing page.

In an optional implementation, the determining, in response to receiving the preset identification operation triggered for the capturing frame on the capturing page, the target image having image clarity meeting the preset clarity condition based on the capturing frame on the capturing page includes:
 obtaining, in response to receiving the preset identification operation triggered for the capturing frame on the capturing page, a set of images to be processed, wherein the set of images to be processed includes consecutive multiple frames of images with a current image corresponding to the capturing frame as an end frame; and
 determining an image having image clarity meeting the preset clarity condition in the set of images to be processed as the target image.

In an optional implementation, if determining that there is no image meeting the preset clarity condition in the set of images to be processed, identification failure prompt information is displayed on the capturing page.

In a second aspect, the present disclosure further provides an image processing apparatus. The apparatus includes:
 a first determination module, configured to determine, in response to receiving a preset identification operation triggered for a capturing frame on a capturing page, a target image having image clarity meeting a preset clarity condition based on the capturing frame on the capturing page; and
 a transmission module, configured to transmit the target image to an image identification server, wherein the image identification server is configured to identify the target image.

In a third aspect, the present disclosure further provides a computer-readable storage medium. The computer-readable storage medium has instructions stored thereon, wherein the instructions, when run on a terminal device, cause the terminal device to implement the above image processing method.

In a fourth aspect, the present disclosure further provides a device. The device includes a memory, a processor, and a computer program stored on the memory and capable of running on the processor, wherein the computer program, upon executed by the processor, cause the processor to implement the above image processing method.

In a fifth aspect, the present disclosure further provides a computer program product. The computer program product includes a computer program/instructions, wherein when the computer program/instructions is/are executed by a processor, the above image processing method is implemented.

Compared with the prior art, the technical solutions provided in examples of the present disclosure have the following advantages:

An embodiment of the present disclosure provides an image processing method. Firstly, in response to receiving a preset identification operation triggered for a capturing frame on a capturing page, a target image having image clarity meeting a preset clarity condition is determined based on the capturing frame on the capturing page. The target image is then transmitted to an image identification server for identifying the target image. Thus, the image processing method provided in the embodiments of the present disclosure can determine a target image having image clarity meeting a preset clarity condition first before image identification and allow the image identification server to perform image identification on the target image meeting the preset clarity condition, thereby the accuracy of image identification can be improved.

In addition, since the target image for identification meets the preset clarity condition, cases of invalid input and invalid identification are reduced. Therefore, the image identification efficiency is improved as a whole.

BRIEF DESCRIPTION OF THE DRAWINGS

The accompanying drawings herein are incorporated into the specification as a part of the specification, for illustrating embodiments that comply with the present disclosure, and the drawings are used combined with the specification to explain the principles of the present disclosure.

In order to provide a clearer explanation of the disclosed embodiments or technical solutions in the prior art, a brief introduction will be given to the accompanying drawings required in the embodiments or description of the prior art. It is evident that for those skilled in the art, other accompanying drawings can be obtained based on these drawings without any creative effort.

DETAILED DESCRIPTION

In order to better understand the above objectives, features, and advantages of the present disclosure, the following will further describe the disclosed solutions. It should be noted that in the absence of conflict, the embodiments disclosed herein and the features in the embodiments can be combined with each other.

Many specific details have been elaborated in the following description to facilitate a full understanding of the present disclosure, but the present disclosure can also be implemented in other ways different from those described here. Obviously, the embodiments in the specification are only a portion of the embodiments disclosed in this disclosure, rather than all of them.

To improve the accuracy of image identification, an embodiment of the present disclosure provides an image processing method. Firstly, when a preset identification operation triggered for a capturing frame on a capturing page is received, a target image having image clarity meeting a preset clarity condition is determined based on the capturing frame on the capturing page. The target image is then transmitted to an image identification server for identifying the target image. Thus, the image processing method provided in the embodiments of the present disclosure can determine a target image having image definition meeting a preset clarity condition first before image identification and allow the image identification server to perform identification based on the target image which meets the preset clarity condition, thereby improving the accuracy of image identification.

In addition, since the target image for identification meets the preset image definition condition, cases of invalid input and invalid identification are reduced. Therefore, the image identification efficiency is improved as a whole.

Figure 1:
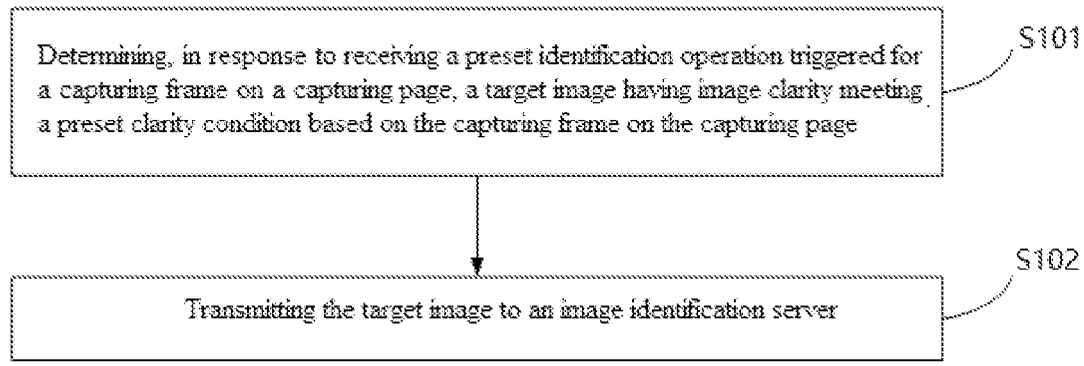
FIG. 1 is a flowchart of an image processing method provided by embodiments of the present disclosure.

On this basis, the embodiments of the present disclosure provide an image processing method. FIG. 1 is a flowchart of an image processing method provided in the embodiments of the present disclosure. The image processing method includes the following steps.

S101: in response to receiving a preset identification operation triggered for a capturing frame on a capturing page, a target image having image clarity meeting a preset clarity condition is determined based on the capturing frame on the capturing page.

In the embodiments of the present disclosure, the triggering the preset identification operation for the capturing frame on the capturing page may include a plurality of manners. For example, a first manner is to trigger a long-press operation for the capturing frame on the capturing page, where the long-press operation may be triggered for any position on the capturing frame; a second manner is to trigger an operation on an identification control set on the capturing page, where the identification control may be set at any position on the capturing page (such as a right position and a bottom position of the capturing page); and so on.

In the embodiments of the present disclosure, when the preset identification operation triggered for the capturing frame on the capturing page is received, an image having image clarity meeting the preset clarity condition is determined as the target image based on the capturing frame on the capturing page. Specific implementations will be described in subsequent embodiments, which will not be described here redundantly.

The capturing frame on the capturing page may include one image or a plurality of continuous images shot by a current camera.

In the embodiments of the present disclosure, the image having the image clarity meeting the preset clarity condition is determined as the target image based on the capturing frame on the capturing page. In subsequent identification process, identification is performed based on the target image which meets the preset clarity condition, which is conducive to reducing invalid input. A manner of determining whether the image clarity of an image meets the preset clarity condition may include processing the image based on an image clarity model to obtain the target image meeting the preset clarity condition.

For example, it is assumed that the image clarity model is configured in a client (such as a mobile phone, a tablet computer, and a computer) with a capturing function (e.g., a camera), where the image clarity model may be obtained by training based on image samples different in clarity. After the target image is processed by the image clarity model, a score of the target image may be output. Assuming that a threshold of an image clarity score is set to 80, an image meeting the preset clarity condition refers to that the corresponding image clarity score of the image is greater than or equal to 80.

It needs to be noted that the preset threshold of the image clarity score is used for determining whether the image clarity of an image meets the preset clarity condition, which may be set to 80, 85, 90, and the like based on requirements. The embodiments of the present disclosure do not limit the preset threshold of the image clarity score.

S102: the target image is transmitted to an image identification server.

The image identification server is configured to identify the target image.

In the embodiments of the present disclosure, the target image determined in step S101 is transmitted to the image identification server, and then the target image is identified by the image identification server. The image identification server is in communication connection with a client. Based on the communication connection between the image identification server and the client, the client is capable of transmitting the target image to the image identification server, and the image identification server is capable of returning an identification result and/or a template recommended based on the identification result and the like to the client.

In the embodiments of the present disclosure, if the identification of the target image is successful, the image identification server is capable of returning the identification result and/or a template recommended based on the identification result and the like to the client. For example, the image identification server returns the description information of the identification result "sunflower" corresponding to the target image to the client, or returns a recommended template corresponding to the corresponding identification result "sunflower" of the target image. If the identification of the target image is failed, the image identification server is capable of returning an instruction of failed identification to the client to provide a prompt of failed image identification for a user. Meanwhile, the image identification server may return a general recommended template based on general scene recognition to the client. For example, a text is displayed in a blinking manner on the capturing page to prompt the user, or a prompt is provided in the form of Toast for the user. Specifically, the prompt text may be "No matching result is identified. A general template is recommended for you, or please try to identify again!", and meanwhile, a general template or multiple general templates are displayed at the bottom of the capturing page.

In the image processing method provided in the embodiments of the present disclosure, firstly, when the preset identification operation triggered for the capturing frame on the capturing page is received, the target image having image clarity meeting the preset clarity condition is determined based on the capturing frame on the capturing page. The target image is then transmitted to the image identification server configured to identify the target image. Thus, the image processing method provided in the embodiments of the present disclosure can determine a target image having image clarity meeting a preset clarity condition first before image identification and allow an image identification server to perform identification based on the target image meeting the preset clarity condition, thereby improving the accuracy of image identification. In addition, since the target image for identification meets the preset clarity condition, cases of invalid input and invalid identification are reduced. Therefore, the image identification efficiency can be improved as a whole.

On the basis of the foregoing embodiments, a method for determining whether the image clarity meets the preset clarity condition may be implemented in a plurality of manners. Two specific implementations are described below.

Figure 2:
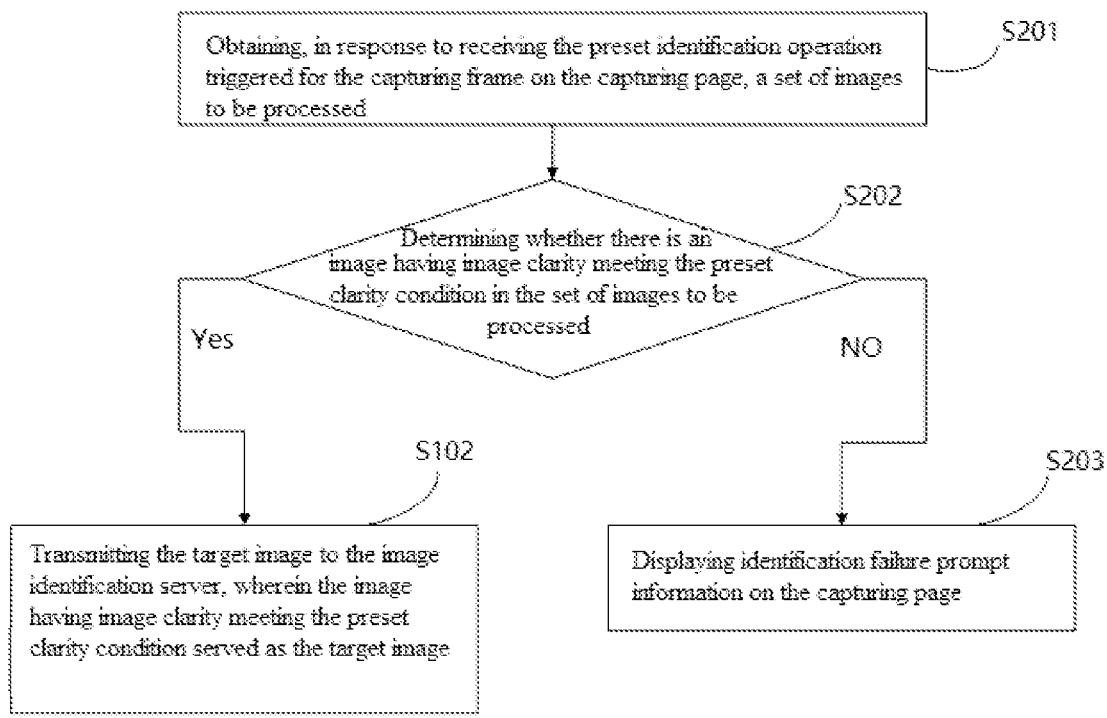
FIG. 2 is a flowchart of another image processing method provided by embodiments of the present disclosure.

In an alternative implementation, as shown in FIG. 2 which is a flowchart of another image processing method provided in an embodiment of the present disclosure, the step S101 specifically includes the following steps.

S201: when the preset identification operation triggered for the capturing frame on the capturing page is received, a set of images to be processed is obtained.

The set of images to be processed includes a plurality of continuous images with the corresponding current image of the capturing frame as an end frame.

In the embodiment of the present disclosure, when the preset identification operation triggered for the capturing frame on the capturing page is received, a set of images to be processed is obtained, where the set of images to be processed includes consecutive multiple frames of images with a current image corresponding to the capturing frame as an end frame. In general, a preview image in a camera preview interface is stored in the form of a preview stream. When the preset identification operation triggered for the capturing frame on the capturing page is received, the latest N preview images are obtained from preview images stored in the form of the preview stream, and together with the current image, form the set of images to be processed.

It needs to be noted that the plurality of continuous images with the corresponding current image of the capturing frame as the end frame in the set of images to be processed may be continuous 5 images, continuous 7 images, and so on. The embodiments of the present disclosure do not limit the specific number of a plurality of continuous images.

S202: whether there is an image having image clarity meeting the preset clarity condition in the set of images to be processed is determined, and if yes, the image meeting the preset clarity condition is determined as the target image and step S102 is performed; and if no, step S203 is performed.

In the embodiments of the present disclosure, each image in the set of images to be processed may be processed based on an image identification model to determine whether there is the image having the image clarity meeting the preset clarity condition in the set of images to be processed.

Taking an example that the client is equipped with the image clarity model and the threshold of the image clarity score is set to 80, an image meeting the preset clarity condition refers to that the corresponding image clarity score of the image is greater than or equal to 80. Specifically, the set of images to be processed (assumed as including image 1 to image 5) obtained in step S201 is input to the image clarity model. The image clarity score of each image is obtained based on the processing of the image clarity model, and each image clarity score is compared with the preset threshold (e.g., 80) to determine whether there is the image meeting the preset clarity condition in the set of images to be processed.

For example, if only one image in the set of images to be processed has an image clarity score greater than or equal to the image clarity threshold, i.e., only one image meets the preset clarity condition, the image is directly determined as the target image. Assuming that the image clarity scores of the image 1 to the image 5 are 70, 74, 76, 79, and 82, respectively, the image clarity score of the image 5 is greater than the preset threshold (e.g., 80), i.e., the image 5 is the image meeting the preset clarity condition. After the image 5 is determined as the target image, step S102 in the foregoing embodiments is continuously performed.

For example, if a plurality of images in the set of images to be processed have an image clarity score greater than or equal to the image clarity threshold, i.e., a plurality of images in the set of images to be processed meet the preset clarity condition, the image corresponding to the highest image clarity score is determined as the target image. Assuming that the image clarity scores of the image 1 to the image 5 are 70, 74, 78, 82, and 90, respectively, the image clarity scores of the image 4 and the image 5 are greater than the preset threshold (e.g., 80), i.e., the image 4 and the image 5 are the images meeting the preset clarity condition, and since the image clarity score of the image 5 is the highest, the image 5 may be selected as the target image. After the image 5 is determined as the target image, step S102 in the foregoing embodiments is continuously performed.

In addition, an image may be randomly determined from a plurality of images meeting the preset clarity condition in the set of images to be processed as the target image.

If image clarity scores of the images in the set of images to be processed are all less than the image clarity threshold, i.e., it is determined that there is no image meeting the preset clarity condition in the set of images to be processed, step S203 is performed.

S203: identification failure prompt information is displayed on the capturing page.

In the embodiments of the present disclosure, if it is determined that there is no image meeting the preset clarity condition in the set of images to be processed, the identification failure prompt information is displayed on the capturing page. For example, prompt information "Identification is failed. Please trigger the identification function again" is displayed on the capturing page and blinks at preset time intervals; or Toast pops up on the capturing page to prompt an identification failure for the user.

Thus, in the embodiments of the present disclosure, when determining that there is no target image having the clarity meeting the preset image clarity condition, the client may not transmit the target image to the image identification server. The number of times of invalid identification by the image identification server is reduced. Meanwhile, waste of network resources between the client and the image identification server is reduced.

In the above alternative implementation, when the preset identification operation triggered for the capturing frame on the capturing page is received, a set of images to be processed including a plurality of continuous images is obtained for determining the target image. Since the set of images to be processed is stored on the client, there may arise problems of occupying of too much memory and reduction of running speed of the client system. Therefore, to reduce the pressure caused to the memory of the client, only one corresponding current image of the capturing frame may be obtained each time when the preset identification operation triggered for the capturing frame on the capturing page is received.

Figure 3:
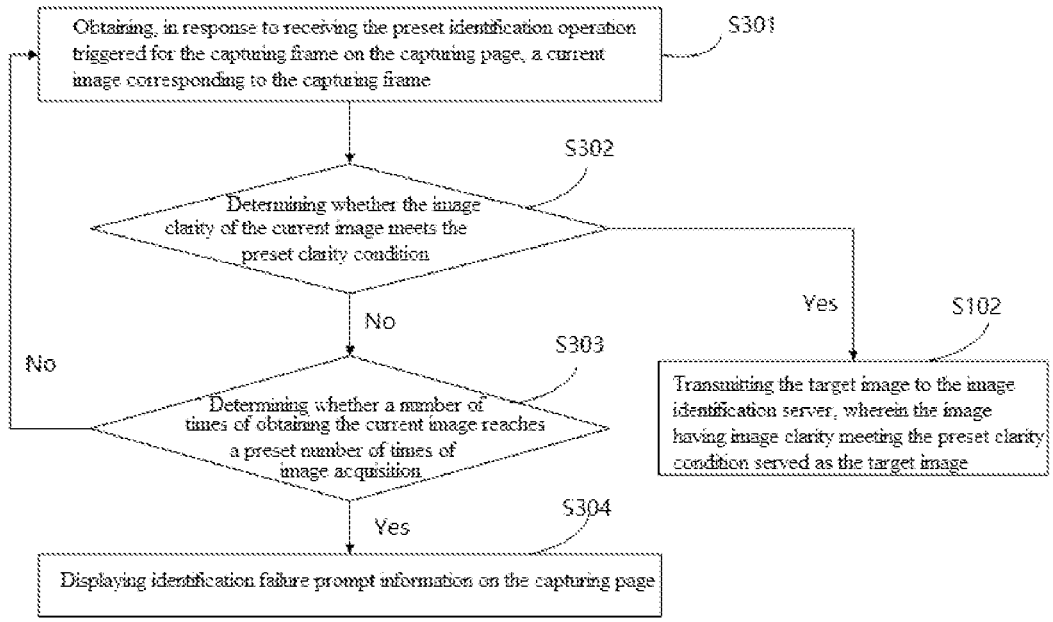
FIG. 3 is a flowchart of another image processing method provided by embodiments of the present disclosure.

To this end, an implementation of the present disclosure provides another flowchart of the image processing method. With reference to FIG. 3, the image processing method includes the following steps:

S301: when a preset identification operation triggered for a capturing frame on a capturing page is received, a current image corresponding to the capturing frame is obtained.

In the embodiments of the present disclosure, when the preset identification operation triggered for the capturing frame on the capturing page is received, the current image corresponding to the capturing frame is obtained. The current image corresponding to the capturing frame includes one image, e.g., image 1.

S302: whether the image clarity of the current image meets a preset clarity condition is determined. If yes, the current image is determined as a target image and step S102 is performed. If no, step S303 is performed.

In the embodiments of the present disclosure, the obtained current image is processed based on an image identification model to determine whether the image clarity of the current image meets the preset clarity condition. Taking as an example that the client is equipped with the image clarity model and the threshold of the image clarity score is set to 80, an image meeting the preset clarity condition refers to that the corresponding image clarity score of the image is greater than or equal to 80. Specifically, the current image obtained in step S301 is input to the image clarity model. An image clarity score of the current image is obtained based on the processing of the image clarity model and compared with a preset threshold (e.g., 80) to determine whether the image clarity of the current image meets the preset clarity condition.

When the image clarity score of the current image is greater than or equal to the image clarity threshold, the current image is determined as the target image, and then step S102 in the foregoing embodiment is continuously performed. Otherwise, it is determined that the current image does not meet the preset clarity condition and step S303 is performed.

S303: whether a number of times of obtaining the current image reaches a preset number of times of image acquisition is determined. If no, step S301 is performed; and if yes, step S304 is performed.

In the embodiments of the present disclosure, after the image clarity of the current image is determined as not meeting the preset clarity condition, whether the number of times of obtaining the current image has reached the preset number of times of image acquisition is determined, i.e., the number of times of obtaining the current image is compared with the preset number of times of image acquisition. The preset number of times of image acquisition may be 3, 5, 7, or the like. The embodiments of the present disclosure do not limit the preset number of times of image acquisition.

For example, assuming that the preset number of times of image acquisition is 3, when the preset identification operation triggered for the capturing frame on the capturing page is received, the corresponding current image (e.g., image 1) of the capturing frame is obtained for a first time. If the image clarity score of the image 1 obtained based on the processing of the image clarity model is less than the preset threshold (e.g., 80), the image clarity of the image 1 is determined as not meeting the preset clarity condition. Then, the number (accumulated as one time) of times of obtaining the current image is determined as not reaching the preset number (e.g., 3) of times of image acquisition, step S301 is continuously performed. That is, the current image (e.g., image 2) corresponding to the capturing frame is obtained for a second time. If the image clarity score of the image 2 obtained based on the processing of the image clarity model is less than the preset threshold (e.g., 80), the image clarity of the image 2 is determined as not meeting the preset clarity condition. Then, the number (accumulated as two times) of times of obtaining the current image is determined as not reaching the preset number (e.g., 3) of times of image acquisition, step S301 is continuously performed. That is, the current image (e.g., image 3) corresponding to the capturing frame is obtained for a third time. If the image clarity score of the image 3 obtained based on the processing of the image clarity model is less than the preset threshold (e.g., 80), the image clarity of the image 3 is determined as not meeting the preset clarity condition. Then, the number (accumulated as three times) of times of obtaining the current image is determined as reaching the preset number (e.g., 3) of times of image acquisition. At this time, the current image corresponding to the capturing frame does not need to be obtained again. Instead, step S304 is performed, and a prompt of failed identification is provided for the user.

S304: identification failure prompt information is displayed on the capturing page.

In the embodiments of the present disclosure, when the number of times of obtaining the current image is determined as already reaching the preset number of times of image acquisition and it is determined that there is no image meeting the preset clarity condition, the identification failure prompt information is displayed on the capturing page. A specific prompting manner is as described in step S203, which will not be redundantly described here.

In the image processing method provided in the embodiments of the present disclosure, when the preset identification operation triggered for the capturing frame on the capturing page is received, the corresponding current image of the capturing frame is obtained, and whether the image clarity of the current image meets the preset clarity condition is determined. If yes, the current image is determined as the target image; and if no, a current image corresponding the capturing frame is continuously obtained until the image clarity of the obtained current image meets the preset clarity condition or the number of times of obtaining the current image reaches the preset number of times of image acquisition. Then, the target image is transmitted to the image identification server or the identification failure prompt information is displayed on the capturing page. Thus, the image processing method provided in the embodiments of the present disclosure can solve the problem of reduction in the running speed of the client system due to occupying of too much memory when determining the clarity of an image.

To further improve the identification efficiency of the image identification server, before the target image is transmitted to the image identification server for image identification, firstly, the target image may be initially identified at the client. An initial identification result and the target image may be then transmitted to the image identification server, and the image identification server performs image identification by combining the target image with the initial identification result. Thus, the identification efficiency for the target image is improved.

In an alternative implementation, a method of initially identifying the target image may include: firstly, extracting an image feature of the target image; then performing matching between the image feature and prestored feature parameters of preset objects; and if determining that the matching is successful, determining a preset object corresponding to the successfully matched feature parameter as an initial identification result for the target image. Then, the target image and the initial identification result for the target image are transmitted to the image identification server, and the target image is identified based on the initial identification result.

In the embodiments of the present disclosure, after the image feature of the target image is extracted, matching is performed between the image feature and the prestored feature parameters of preset objects to initially identify the target image. The feature parameters of preset objects may include a correspondence between a preset object and a feature parameter. For example, the preset objects may include "flower", "grass", "cat", and the like, and the corresponding feature parameters of the preset objects may include a correspondence between "flower" and the feature parameter of "flower", a correspondence between "grass" and the feature parameter of "grass", a correspondence between "cat" and the feature parameter of "cat", and the like.

In the embodiments of the present disclosure, if it is determined that the matching between the image feature of the target image and the prestored feature parameters of the preset objects is successful, the preset object corresponding to the successfully matched feature parameter is determined as the initial identification result for the target image. It will be understood that the more the prestored feature parameters corresponding to the preset objects, the higher the accuracy of the initial identification result for the target image.

In an alternative implementation, the initial identification on an image may be implemented based on an image identification model. For example, the client is equipped with the image identification model, where the image identification model is obtained by training based on image samples with preset objects.

For example, the target image is initially identified by using the image identification model of the client. After the extracted image feature of the target image characterizes the "flower" feature of the target image by the processing of the image identification model, it is determined that the matching between the image feature and the prestored "flower" feature parameter is successful, the preset object "flower" is determined as the initial identification result for the target image.

In the embodiments of the present disclosure, after the corresponding initial identification result for the target image is determined, the target image and the corresponding initial identification result for the target image are transmitted to the image identification server, and the target image is identified by the image identification server based on the initial identification result. For example, the corresponding initial identification result for the target image is determined as "flower", and a type identifier of "flower" and the target image are transmitted together to the image identification server, where the image identification server may include image identification models (such as a "flower identification" model, a "grass identification" model, and a "cat identification" model) for identifying different objects. Then, the "flower identification" model in the image identification server is invoked based on the received type identifier of "flower" to identify the target image and obtain a final identification result. For example, the corresponding final identification result for the target image is "sunflower" and the like.

In the embodiments of the present disclosure, before the target image is transmitted to the image identification server for image identification, firstly, initial identification is performed at the client based on the image feature of the target image to obtain the initial identification result, and then the initial identification result and the target image are transmitted to the image identification server. Since the initial identification result is obtained based on the image feature of the target image, the feature of the target image can be characterized directly. Therefore, the image identification server identifies the target image based on the initial identification result, thereby improving the accuracy of image identification. In addition, the image identification server is capable of invoking a corresponding identification model based on the initial identification result to specifically identify the target image. Therefore, the image identification efficiency is improved as a whole.

In another alternative implementation, during the initial identification of the target image, if it is determined that the matching between the image feature and the prestored feature parameter of the preset object is failed, the target image may be individually transmitted to the image identification server, and the image identification server can perform image identification based on only the target image.

In the embodiments of the present disclosure, the image identification server may further include a universal identification model configured to identify an image failing to match the feature parameters of the preset objects. Specifically, if it is determined that the matching result of matching between the image feature and the prestored feature parameters of preset objects is failed, the target image is individually transmitted to the image identification server and the image identification server can identify the target image with the universal identification model, and after successful identification, the identification result or a template recommended based on the identification result is returned to the client.

Figure 4:
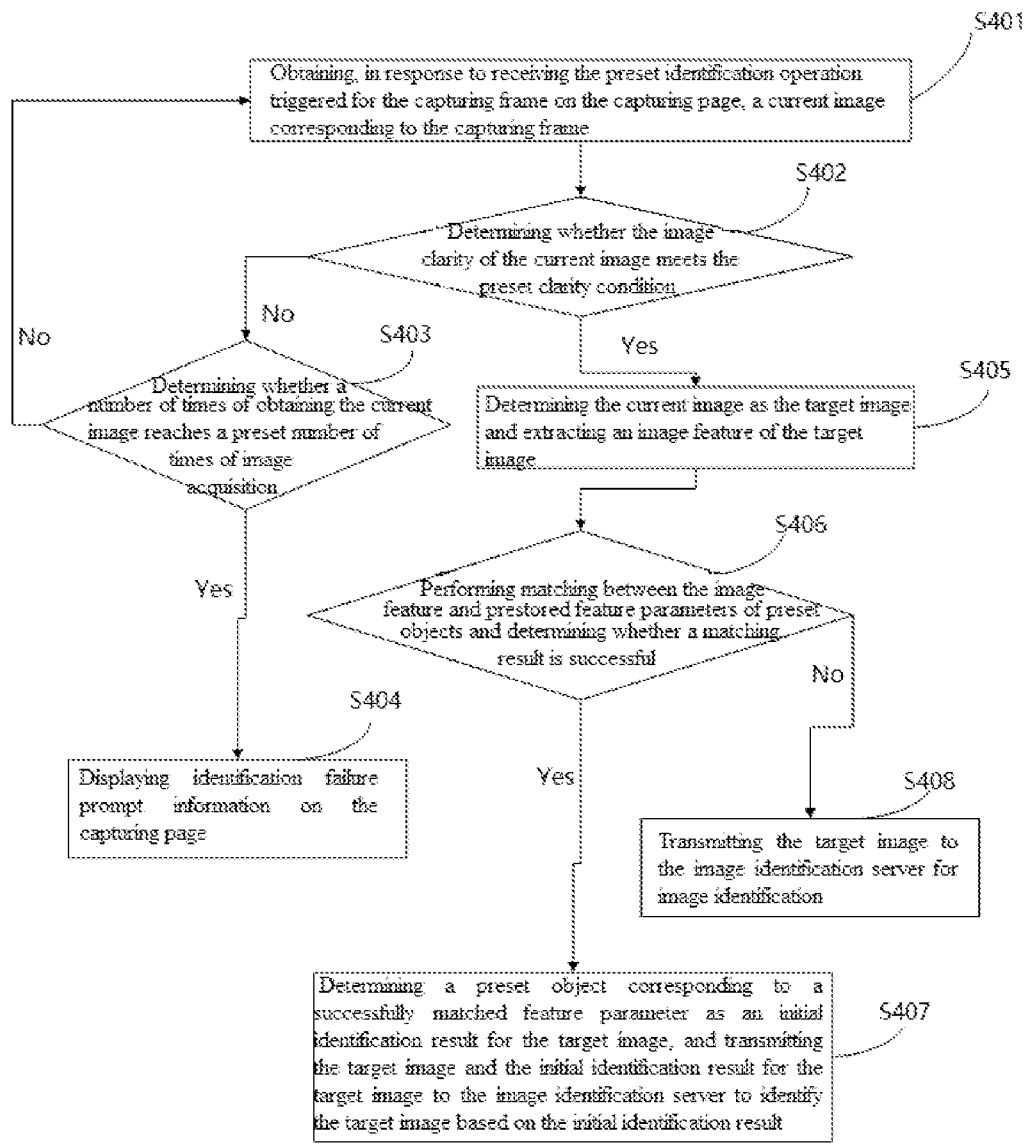
FIG. 4 is a flowchart of another image processing method provided by embodiments of the present disclosure.

On the basis of the foregoing embodiment, taking for example that the client is configured with both of the image clarity model and the image identification model, embodiments of the present disclosure further provide an image processing method. As shown in FIG. 4 which is another flowchart of image processing method provided in the embodiments of the present disclosure, the method includes the following steps:

S401: when a preset identification operation triggered for a capturing frame on a capturing page is received, a current image corresponding to the capturing frame is obtained.

S402: whether the image clarity of the current image meets a preset clarity condition is determined. If yes, the current image is determined as a target image and step S405 is performed. If no, step S403 is performed.

S403: whether a number of times of obtaining the current image reaches a preset number of times of image acquisition is determined. If no, step S401 is performed; and if yes, step S404 is performed.

S404: identification failure prompt information is displayed on the capturing page.

The specific process of steps S401 to S404 has been described in detail in steps S301 to S304 of the foregoing embodiments, which will not be redundantly described here.

S405: an image feature of the target image is extracted.

S406: matching is performed between the image feature and prestored feature parameters of preset objects, and whether a matching result is successful is determined; if yes, step S407 is performed; and if no, step S408 is performed.

In the embodiments of the present disclosure, for example, the feature parameters of preset object include a correspondence between "flower" and the feature parameter of "flower", a correspondence between "grass" and the feature parameter of "grass", and the like. After processing by the image identification model configured in the client, a matching is performed between the image feature and the prestored feature parameters of preset objects, and if the result of matching between the image feature of image 1 and the prestored feature parameter of preset objects result is determined as successful, step S407 is performed. If the result of matching between the image feature of image 2 and the prestored feature parameters of preset object result is determined as failed, step S408 is performed.

S407: a preset object corresponding to the successfully matched feature parameter is determined as an initial identification result for the target image, and the target image and the initial identification result for the target image are transmitted to the image identification server to identify the target image based on the initial identification result.

In the embodiments of the present disclosure, for example, the preset object corresponding to a feature parameter of "flower" is "flower", and then the initial identification result for the image 1 is "flower". The type identifier of "flower" and the image 1 are transmitted together to the image identification server. The image 1 is identified based on the type identifier of "flower" to obtain a final identification result "sunflower". The image identification server returns the description information of "sunflower" or a recommended template associated with the identification result "sunflower" to the client.

S408: the target image is transmitted to the image identification server for image identification.

In the embodiments of the present disclosure, for example, the image 2 is transmitted to the image identification server. After identifying the image 2 based on a universal identification model, the image identification server returns an instruction of failed identification to the client, and returns an identification result or a template recommended based on the identification result. Specifically, "No matching result is identified. The general template is recommended for you, or please try to identify again!" is displayed in the form of Toast on the capturing page. And meanwhile, general templates may be displayed at the bottom of the capturing page.

In the image processing method provided in the embodiments of the present disclosure, when the preset identification operation triggered for the capturing frame on the capturing page is received, the current image corresponding to the capturing frame is obtained, and whether the image clarity of the current image meets the preset clarity condition is determined. If yes, the current image is determined as the target image; and if no, the current image corresponding to the capturing frame is continuously obtained until the image clarity of the obtained current image meets the preset clarity condition or the number of times of obtaining the current image reaches the preset number of times of image acquisition. Moreover, after the target image is determined, the image feature of the target image is extracted. Matching is performed between the image feature and the prestored feature parameters of preset objects, and a preset object corresponding to the successfully matched feature parameter is determined as the initial identification result for the target image. Then, the target image and the initial identification result for the target image are transmitted to the image identification server, and the target image is identified based on the initial identification result at the server side.

Thus, in the embodiments of the present disclosure, firstly, a target image having the image clarity meeting the preset clarity condition is determined before image identification, and the target image can be initially identified based on the image feature of the target image. Thus, the image identification server is allowed to perform image identification on the target image based on the initial identification result, thereby improving the accuracy of image identification.

In addition, since the target image for identification meets the preset clarity condition, cases of invalid input and invalid identification are reduced, and the image identification efficiency is improved as a whole. In addition, on the basis of improving the accuracy of image identification, the number of prompts of failed identification is reduced in the process of image identification by a user, thereby enhancing user experience.

Figure 5:
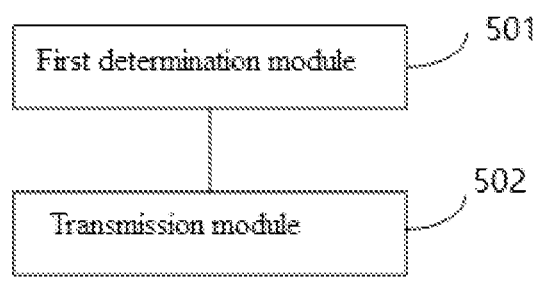
FIG. 5 is a structural schematic diagram of an image processing apparatus provided by embodiments of the present disclosure.

Based on the foregoing method embodiments, the present disclosure further provides an image processing apparatus. With reference to FIG. 5, this FIG. 5 is a structural schematic diagram of an image processing apparatus provided in the embodiments of the present disclosure. The image processing apparatus includes:
  a first determination module 501, configured to determine, in response to receiving a preset identification operation triggered for a capturing frame on a capturing page, a target image having image clarity meeting a preset clarity condition based on the capturing frame on the capturing page; and
  a transmission module 502, configured to transmit the target image to an image identification server, wherein the image identification server is configured to identify the target image.

In an alternative implementation, the apparatus further includes:
  an extraction module configured to extract an image feature of the target image;
  a matching module configured to perform matching between the image feature and prestored feature parameters of preset objects; and
  a second determination module configured to, if determining that the matching is successful, determine a preset object corresponding to the successfully matched feature parameter as an initial identification result for the target image.

Correspondingly, the transmission module 502 includes:
  a first transmission submodule configured to transmit the target image and the initial identification result for the target image to the image identification server, where the image identification server is configured to identify the target image based on the initial identification result.

In an alternative implementation, the transmission module 502 further includes:
  a second transmission submodule configured to, if determining that the matching between the image feature and the prestored feature parameters of the preset objects is failed, transmit the target image to the image identification server.

In an alternative implementation, the first determination module 501 includes:
  a first obtaining submodule configured to, when receiving the preset identification operation triggered for the capturing frame on the capturing page, obtain a current image corresponding to the capturing frame and determine whether the image clarity of the current image meets the preset clarity condition; and
  a second determination submodule configured to, if determining that the image clarity of the current image meets the preset clarity condition, determine the current image as the target image, otherwise re-perform the step of obtaining a current image corresponding to the capturing frame and determining whether the image clarity of the current image meets the preset clarity condition until a preset number of times of image acquisition is reached.

In an alternative implementation, the image processing apparatus further includes:
  a first prompting module configured to, when determining that the preset number of times of image acquisition is reached and determining that no image meets the preset clarity condition, display identification failure prompt information on the capturing page.

In an alternative implementation, the first determination module 501 includes:
  a second obtaining submodule configured to, when receiving the preset identification operation triggered for the capturing frame on the capturing page, obtain a set of images to be processed, where the set of images to be processed includes consecutive multiple frames of images with a current image corresponding to the capturing frame as an end frame; and
  a second determination submodule configured to determine an image having image clarity meeting the preset clarity condition in the set of images to be processed as the target image.

In an alternative implementation, the image processing apparatus further includes:
  a second prompting module configured to, if determining that there is no image meeting the preset clarity condition in the set of images to be processed, display identification failure prompt information on the capturing page.

In the image processing apparatus provided in the embodiments of the present disclosure, firstly, when the preset identification operation triggered for the capturing frame on the capturing page is received, the target image having image clarity meeting the preset clarity condition is determined based on the capturing frame on the capturing page. The target image is then transmitted to an image identification server configured to identify the target image. Thus, the image processing apparatus provided in the embodiments of the present disclosure can determine the target image having the image clarity meeting the preset clarity condition first before image identification and allow the image identification server to perform identification based on the target image meeting the preset clarity condition, thereby improving the accuracy of image identification.

In addition, since the target image for identification meets the preset clarity condition, cases of invalid input and invalid identification are reduced. Therefore, the image identification efficiency is improved as a whole.

In addition to the above image processing method and apparatus, embodiments of the present disclosure further provide a computer-readable storage medium, where instructions are stored on the computer-readable storage medium, and when run on a terminal device, cause the terminal device to implement the image processing method described in the embodiments of the present disclosure.

An embodiment of the present disclosure further provides a computer program product, including a computer program/instructions, where when the computer program/instructions is/are executed by a processor, the image processing method described in the embodiments of the present disclosure is implemented.

Figure 6:
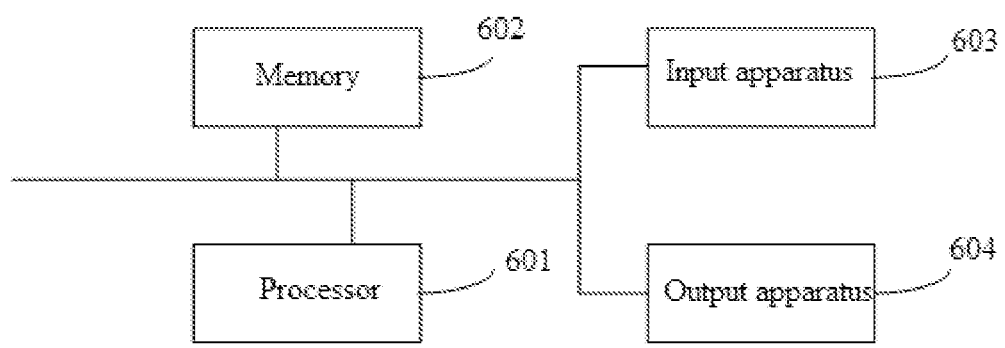
FIG. 6 is a structural schematic diagram of an image processing device provided by embodiments of the present disclosure.

In addition, an embodiment of the present disclosure further provides an image processing device. Referring to FIG. 6, the image processing device may include:

a processor 601, a memory 602, an input apparatus 603, and an output apparatus 604. The image processing device may have one or more processors 601. One processor is shown in FIG. 6 as an example. In embodiments of the present disclosure, the processor 601, the memory 602, the input apparatus 603, and the output apparatus 604 may be connected by a bus or in other manners, where connection by the bus is shown in FIG. 6 as an example.

The memory 602 may be configured to store software programs and modules. The processor 601 executes various functional applications and data processing of the image processing device by running the software programs and the modules stored on the memory 602. The memory 602 may mainly include a program storage area and a data storage area, where the program storage area may store an operating system, an application required by at least one function, etc. Moreover, the memory 602 may include a high-speed random-access memory, and may also include a non-volatile memory, for example, at least one magnetic disk storage device, a flash memory device, or other volatile solid storage device. The input apparatus 603 may be configured to receive input digit or character information and generate signal inputs related to user settings and function control of the image processing device.

Specifically, in the present embodiments, the processor 601 may load executable files corresponding to processes of one or more applications to the memory 602 and the processor 601 may run the applications stored on the memory 602, thereby realizing various functions of the image processing device.

It should be noted that in this disclosure, relational terms such as "first" and "second" are only used to distinguish one entity or operation from another entity or operation, and do not necessarily require or imply any actual relationship or order between these entities or operations. Moreover, the terms "including", "comprising", or any other variation thereof are intended to encompass non-exclusive inclusion, such that a process, method, item, or device that includes a series of elements not only includes those elements, but also other elements that are not explicitly listed, or also include elements inherent in such a process, method, item, or device. Without further limitations, the elements limited by the statement "including one . . . " do not exclude the existence of other identical elements in the process, method, item, or equipment that includes the said elements.

The above is only the specific implementation method of this disclosure, which enables those skilled in the art to understand or implement this disclosure. The various modifications to these embodiments will be apparent to those skilled in the art, and the general principles defined herein can be implemented in other embodiments without departing from the spirit or scope of the present disclosure. Therefore, this disclosure will not be limited to the embodiments described herein, but rather to the widest scope consistent with the principles and novel features disclosed herein.

What is claimed is:

1. An image processing method, comprising:
   determining, in response to receiving a preset identification operation triggered for a capturing frame on a capturing page, a target image having image clarity meeting a preset clarity condition based on the capturing frame on the capturing page; and
   transmitting the target image to an image identification server, wherein the image identification server is configured to identify the target image, wherein before the transmitting the target image to the image identification server, the method further comprises:
   extracting an image feature of the target image;
   performing matching between the image feature and prestored feature parameters of preset objects; and
   determining, in response to determining that the matching is successful, a preset object corresponding to a successfully matched feature parameter as an initial identification result for the target image, and
   wherein the transmitting the target image to the image identification server comprises:
   transmitting the target image and the initial identification result for the target image to the image identification server, wherein the image identification server is configured to identify the target image based on the initial identification result.

2. The image processing method according to claim 1, wherein the transmitting the target image to the image identification server further comprises:
   if determining that the matching between the image feature and the prestored feature parameters of the preset objects is failed, transmitting the target image to the image identification server.

3. The image processing method according to claim 1, wherein the determining, in response to receiving the preset identification operation triggered for the capturing frame on the capturing page, the target image having image clarity meeting the preset clarity condition based on the capturing frame on the capturing page comprises:
   obtaining, in response to receiving the preset identification operation triggered for the capturing frame on the capturing page, a current image corresponding to the capturing frame and determining whether the image clarity of the current image meets the preset clarity condition; and
   if determining that the image clarity of the current image meets the preset clarity condition, determining the current image as the target image, otherwise re-performing the step of obtaining a current image corresponding to the capturing frame and determining whether the image clarity of the current image meets the preset clarity condition until a preset number of times of image acquisition is reached.

4. The image processing method according to claim 3, further comprising:
   when the preset number of times of image acquisition is reached and no image meets the preset clarity condition is determined, displaying identification failure prompt information on the capturing page.

5. The image processing method according to claim 1, wherein the determining, in response to receiving the preset identification operation triggered for the capturing frame on the capturing page, the target image having image clarity meeting the preset clarity condition based on the capturing frame on the capturing page comprises:

obtaining, in response to receiving the preset identification operation triggered for the capturing frame on the capturing page, a set of images to be processed, wherein the set of images to be processed comprises consecutive multiple frames of images with a current image corresponding to the capturing frame as an end frame; and determining an image having image clarity meeting the preset clarity condition in the set of images to be processed as the target image.

6. The image processing method according to claim 5, further comprising:

displaying, in response to determining that there is no image meeting the preset clarity condition in the set of images to be processed, identification failure prompt information on the capturing page.

7. The image processing method according to claim 1, further comprising:

receiving an identification result transmitted by the image identification server and/or a template recommended based on the identification result.

8. An image processing apparatus, comprising:

a processor;

a first determination module executed by the processor, configured to determine, in response to receiving a preset identification operation triggered for a capturing frame on a capturing page, a target image having image clarity meeting a preset clarity condition based on the capturing frame on the capturing page; and a transmission module executed by the processor, configured to transmit the target image to an image identification server, wherein the image identification server is configured to identify the target image, wherein before transmitting the target image to the image identification server, the transmission module is further configured to:

extract an image feature of the target image;

perform matching between the image feature and pre-stored feature parameters of preset objects; and determine, in response to determining that the matching is successful, a preset object corresponding to a successfully matched feature parameter as an initial identification result for the target image, and wherein the transmitting the target image to the image identification server comprises:

transmitting the target image and the initial identification result for the target image to the image identification server, wherein the image identification server is configured to identify the target image based on the initial identification result.

9. A non-transitory computer-readable storage medium with instructions stored thereon, wherein the instructions, when run on a terminal device, cause the terminal device to implement the image processing method according to claim 1.

10. A device, comprising a memory, a processor, and a computer program stored on the memory and capable of running by the processor, wherein the computer program, upon executed by the processor, cause the processor to:

determine, in response to receiving a preset identification operation triggered for a capturing frame on a capturing page, a target image having image clarity meeting a preset clarity condition based on the capturing frame on the capturing page; and transmit the target image to an image identification server, wherein the image identification server is configured to identify the target image, wherein before transmitting the target image to the image identification server, the computer program further causes the processor to:

extract an image feature of the target image;

perform matching between the image feature and pre-stored feature parameters of preset objects; and determine, in response to determining that the matching is successful, a preset object corresponding to a successfully matched feature parameter as an initial identification result for the target image, and wherein the transmitting the target image to the image identification server comprises:

transmitting the target image and the initial identification result for the target image to the image identification server, wherein the image identification server is configured to identify the target image based on the initial identification result.

11. A computer program product, comprising a non-transitory computer-readable storage medium storing a computer program, wherein when the computer program is executed by a processor, the image processing method according to claim 1 is implemented.

\* \* \* \* \*